Figure 1:
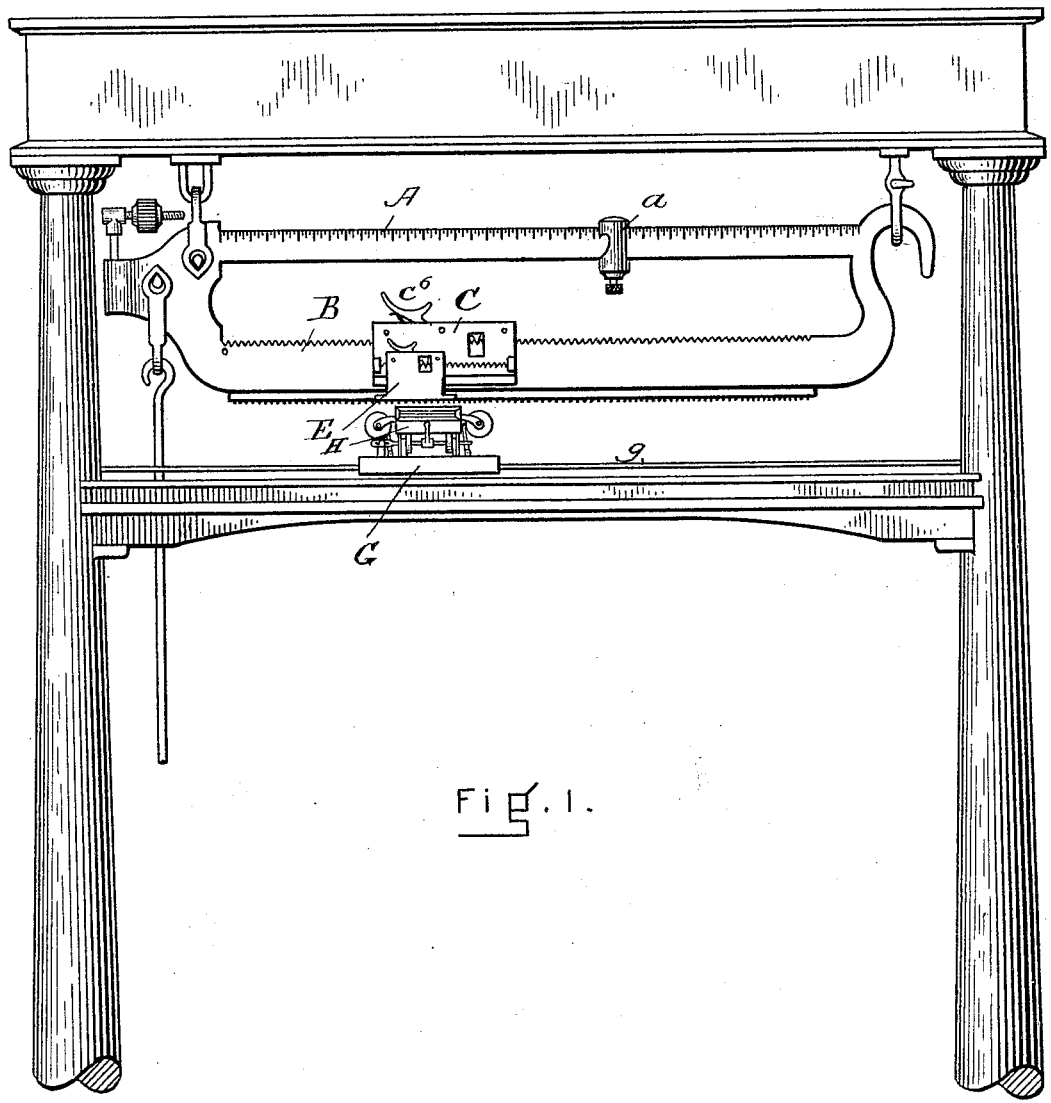

(No Model.) 4 Sheets—Sheet 1.

J. CAMPBELL.
SELF REGISTERING SCALE.

No. 544,207. Patented Aug. 6, 1895.

Witnesses
J. W. Dolan.
H. G. Mayrhofer

Inventor
Jeremiah Campbell
by his Atty
Clark L. Raymond (No Model.) 4 Sheets—Sheet 2.

J. CAMPBELL.
SELF REGISTERING SCALE.

No. 544,207. Patented Aug. 6, 1895.

WITNESSES
J. M. Dolan.
N. G. Mayrhofer

INVENTOR
Jeremiah Campbell
by his Atty
Clark & Raymond (No Model.) 4 Sheets—Sheet 3.
J. CAMPBELL.
SELF REGISTERING SCALE.

No. 544,207. Patented Aug. 6, 1895.

WITNESSES.
J. M. Dolan.
N. G. Mayrhofer

INVENTOR
Jeremiah Campbell
by his Atty
Clarke & Raymond (No Model.) 4 Sheets—Sheet 4.

J. CAMPBELL.
SELF REGISTERING SCALE.

No. 544,207. Patented Aug. 6, 1895.

WITNESSES.
J. M. Dolan
N. G. Mayrhofer

INVENTOR.
Jeremiah Campbell
by his attys
Clarke & Raymond

UNITED STATES PATENT OFFICE.

JEREMIAH CAMPBELL, OF CHELSEA, MASSACHUSETTS.

SELF-REGISTERING SCALE.

SPECIFICATION forming part of Letters Patent No. 544,207, dated August 6, 1895.

Application filed January 19, 1895. Serial No. 535,480. (No model.)

*To all whom it may concern:*

Be it known that I, JEREMIAH CAMPBELL, a citizen of the United States, residing at Chelsea, in the county of Suffolk and State of Massachusetts, have invented a new and useful Improvement in Self-Registering Scales, of which the following is a full, clear, and exact description, reference being had to the accompanying drawings, forming a part of this specification in explaining its nature.

My invention relates to an improvement in registering-scales, and especially to means whereby, by the movement of one or more counterpoises upon the scale-beam in the act of balancing the load to be weighed, numerals or other indicating-marks representing the amount of the weight are so brought into position or exposed that impressions may be readily taken from them by a recording device, which preferably is constituted to take two or more impressions simultaneously, and in carrying the invention into effect I have represented the scale as having a beam bearing a line of figures or other indicating-marks corresponding with the graduations of the beam and a counterpoise movable thereon and carrying or supporting a movable beam upon which is a secondary counterpoise bearing numerals or indicating-marks in reverse order from those of the scale-beam, and the two counterpoises being so controlled by the notches of their respective beams that when the load upon the scales has been accurately weighed the figures or numerals indicating such weight are in such relation to each other that they may both be simultaneously impressed upon the recording strips, sheets, or slips.

It will be understood, preferably, that the main-beam numerals indicate with the counterpoises hundreds and decimal parts to ten, and that the supplemental counterpoise and traveling beam indicate units to ten. The recording mechanism may be carried upon a separate support to be independently movable horizontally and vertically, or it may be carried by a main counterpoise and be movable therewith, in which case it would have a vertical movement only.

Figure 2:
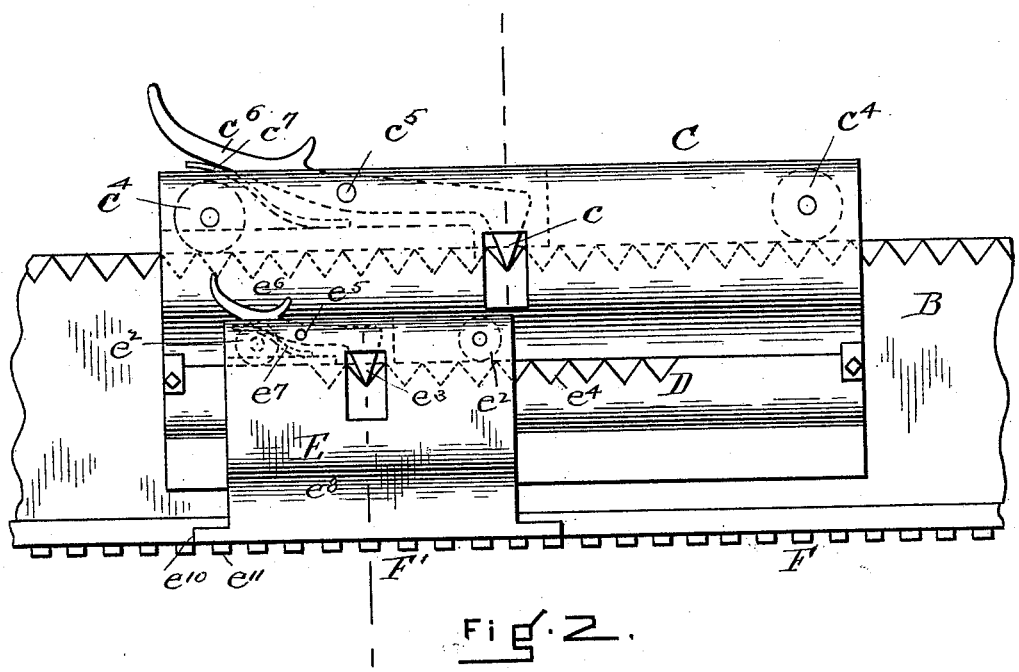
Figure 3:
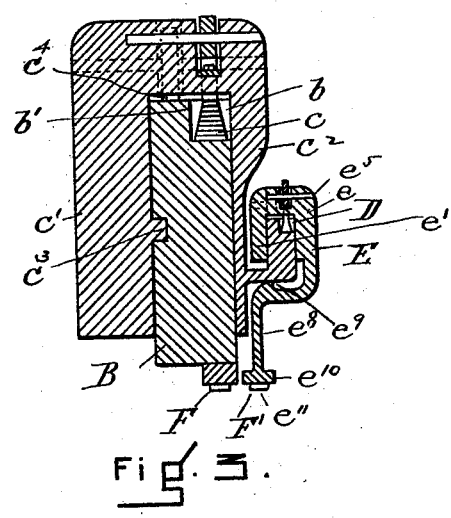
Figure 4:
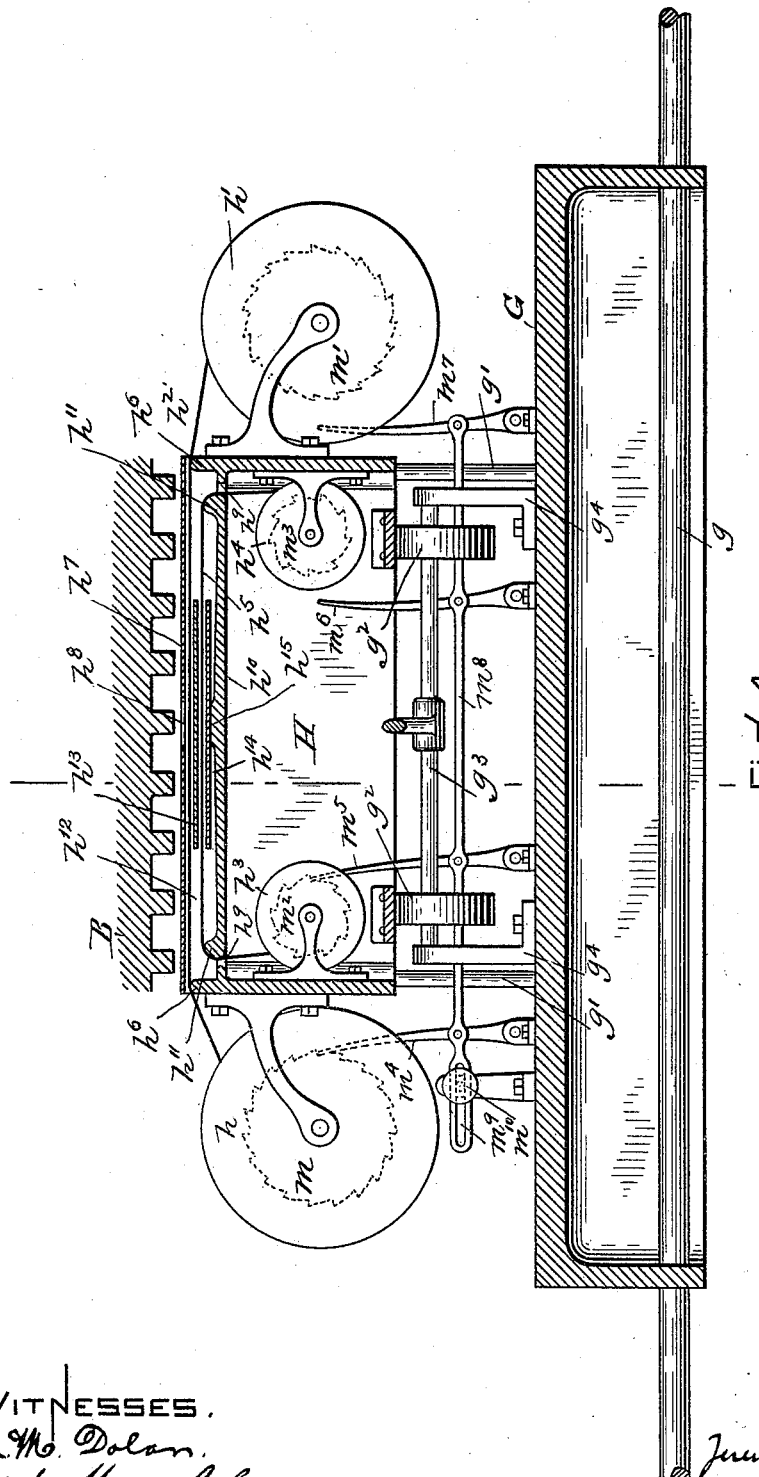
Figure 6:
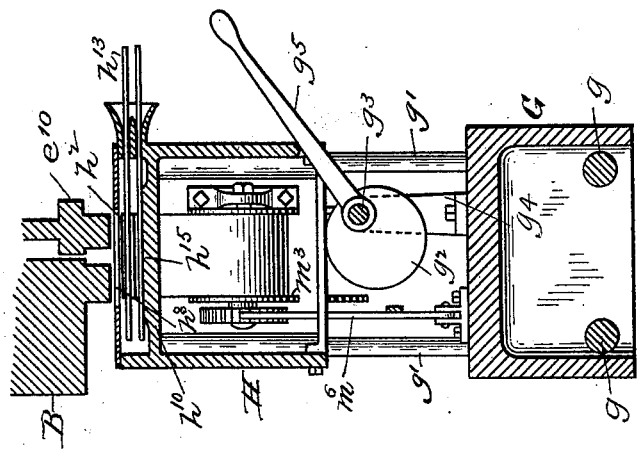
Figure 5:
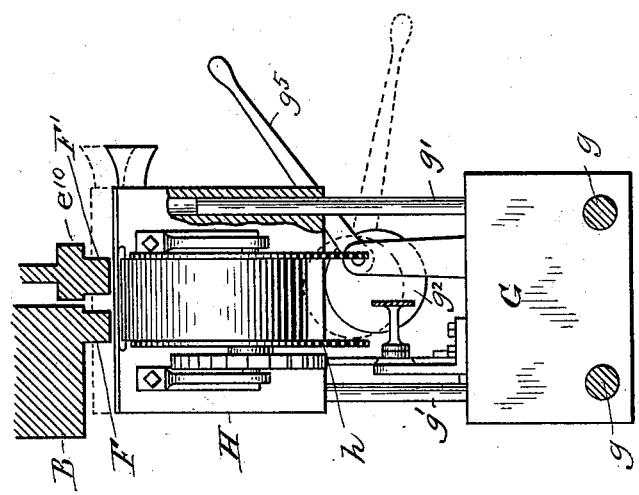

Referring to the drawings, Figure 1 is a view in elevation of the scale-beam, counterpoises, and registering apparatus. Fig. 2 is a view enlarged of a portion of a beam and of the counterpoises mounted thereon. Fig. 3 is a view in vertical section upon the dotted line of Fig. 2. Fig. 4 is a view enlarged in section of the recording apparatus. Fig. 5 is a view in end elevation thereof. Fig. 6 is a view in section upon the dotted line of Fig. 4.

As shown in the drawings, the invention is represented as applied to a scale having two beams—namely, the beam A and the beam B. This type of scale is especially useful in, first, weighing a receptable—such, for instance, as an empty coal-cart—and then its contents, the beam A thus affording means for weighing the cart and the beam B the merchandise.

The beam A is graduated in the ordinary way and has the ordinary weight $a$, which is adapted to be moved upon it. The beam B may or may not have upon its side the ordinary graduations. It has preferably in its upper edge V-shaped notches $b$, (see Fig. 2,) which correspond to graduations and which are of the same depth throughout and are regularly disposed in relation to each other and are adapted to receive and hold a latch $c$, which is carried by the weight or counterpoise C, and which is at its engaging end also V-shaped or pointed, but at a more acute angle than the notches and so that its point will always bottom itself in the lowest or deepest part of the notch by practically a knife-edge contact. The counterpoise C bearing this latch is adapted to be moved readily upon the beam and is of a size or weight to permit the employment of a relatively-short beam. To secure accuracy and ease of movement, I prefer that it be shaped substantially as represented in Figs. 2 and 3—that is, so as to straddle the beam by downward extensions $c'$ and $c^2$, one upon each side of the beam and fitting closely the sides of the beam, and one of the downward extensions may be further connected with the beam by a tongue or rib $c^3$ extending either from the beam or the extension into a corresponding groove in the other member. The notched section $b$ of the beam preferably is arranged to occupy only a section of the top of the beam. (See Fig. 3.) The remaining part $b'$ may then be utilized as a track, upon which antifriction-rolls $c^4$, carried by the weight or counterpoise and supporting it upon the scale-beam, may travel. The latch $c$ is pivoted at $c^5$ to the counterpoise and has extending beyond the surface of the counterpoise, preferably above it, a thumb-piece $c^6$, and a spring $c^7$ bears against the latch-lever and serves to throw downward and hold depressed the latch end.

There is attached to or formed upon the front of the counterpoise a short notched section or beam D, the notches of which may be like those of the beam B, and upon this beam, which, it will be seen, is a traveling beam moving with the weight or counterpoise C which supports it, is the counterpoise E, which is movable thereon and which is attached to the beam in the same way that the counterpoise C is attached to the beam B—that is, it has the downward-extending sections $e\ e'$ to bear against the sides of the beam, the rolls $e^2$ to ride on its top, and it also has a latch $e^3$ with a V-shaped engaging point to engage the V-shaped notches $e^4$ of the beam D, and which latch is pivoted at $e^5$ and has the thumb-piece or extension $e^6$ and closing-spring $e^7$.

The weight E has the downward-extending arm $e^8$ arranged below the beam D and to bear at $e^9$ against it, and it provides a support $e^{10}$ for a line $e^{11}$ of indicating characters, such as numerals, and coinciding with the usual indicating-marks of a scale-beam, which may be arranged also upon the side of the beam D, if desired. This line of indicating devices F is upon the same level as the line of indicating devices F' carried by the scale B, represented in Fig. 3 as upon the under side of the beam, and which correspond with the usual indicating-marks of a scale-beam.

It will be understood that the numerals of the beam B indicate hundredths or larger units than those of the weight E. If, for instance, the numerals of the beam B indicate hundreds, those of the weight E will indicate fractions of a hundred down to tens. It will thus be seen that there is provision for indicating first by the movement of the counterpoise or weight C upon the beam B to the notch about or upon the unit side of the balancing-point that the measuring or weighing has been accomplished to within the limit of ten pounds, or any other desired limit, and that by the movement of the weight-counterpoise E upon the counterpoise C to a position which causes the counterpoise C to absolutely balance, the accurate weight is then established, and that this movement of the weight E will bring its proper indicating numeral or mark in line with the numeral or mark recording the larger denomination, and that the numerals are then in convenient position to be printed upon receiving cards or slips. It will also be noticed that the counterpoise C is made up of its own weight and the weight of its attachments, which, of course, include the counterpoise E and its attachments.

The recording mechanism is illustrated as organized to have horizontal movement below the beam B and upon a line with it and close to its under surface and to also have a vertical movement toward and from it. It comprises a slide G, mounted upon rods or supports $g$ to be moved horizontally thereon. (See Figs. 1 and 4.) The slide supports a bed H, which is mounted upon the rods $g$, extending upward from the slide G and so as to be movable vertically thereon. Vertical movement is imparted to it by means of cams $g^2$ upon a shaft $g^3$, carried by brackets $g^4$ fastened to the surface of the slide G. The shaft $g^3$ is turned to elevate or permit the downward movement of the bed H by means of a lever $g^5$. (See Figs. 5 and 6.)

The bed H carries two sets of rolls, the set $h\ h'$ carrying the inking-ribbon $h^2$ and the set $h^3\ h^4$ the carbon-ribbon $h^5$. The rolls $h\ h'$ are represented as held outside the ends of the bed by suitable brackets, the inking-ribbon running over the supports $h^6$ and beneath a diaphragm $h^7$, in which is a perforation or hole $h^8$. (See Fig. 4.) The rolls $h^3\ h^4$ are arranged within the ends of the bed and are held by appropriate brackets, and the carbon-ribbon passes from one to the other through holes $h^9$ in the platen $h^{10}$ of the bed and over the supports $h^{11}$. The diaphragm $h^7$ preferably is of a flexible nature, like rubber. It is carried by the bed H and serves to uncover to the inking apparatus the numerals or devices of the beam and weight which it is desired to transfer and to cover the others.

The arrangement of the platen, carbon-ribbon, and inking-ribbon is such that the inking-ribbon is immediately below the diaphragm and the carbon-ribbon midway between the inking-ribbon and the platen, and this provides a space $h^{12}$ between the two ribbons for the reception of the slip or card $h^{13}$, upon which the indicating numerals or marks are printed, and the space $h^{14}$ between the carbon-ribbon and the platen for the reception of a second card or slip adapted to receive a double or carbon impression of the indicating figures or marks.

I prefer that the platen have an elevated section $h^{15}$ below the opening $h^8$ in the diaphragm to act to press the lips and ribbons into the hole in the diaphragm sufficiently to properly present them to the indicators. I have shown the ribbon-rolls as automatically turned by pawls and ratchets, the rolls $h\ h'$ having the ratchet-wheels $m\ m'$ and the rolls $h^3\ h^4$ the ratchet-wheels $m^2\ m^3$. There are two sets of pawls shown—namely, the pawls $m^4\ m^5$, which operate to turn one of each set of rolls in one direction, and the pawls $m^6\ m^7$, which serve to turn the other roll of each set in the opposite direction. The two sets of pawls, however, are not operated at the same time. One set is first used to cause the rolls to be revolved in the same direction until they have wound up their respective ribbons, when they are released and the other set thrown into operative relation with the companion rolls upon the other side, and thereby causing them to reverse the movement of the ribbons and to wind them up from the opposite rolls. To throw these sets of pawls into and out of engagement I have represented them as connected by the bar $m^8$, pivoted to each of them and so as to hold two of them at one end into engagement and the other two out of engagement, or vice versa, and the rod or bar is adjusted or movable and held in one of these two positions by means of the slot $m^9$ at one end and the clamping-nut $m^{10}$, which screws upon a threaded stud passing through the slot and serves to clamp the bar against the face of the bracket.

When it is desired that the ribbon shall be wound, the pawls are brought into contact with the ratchets of the winding-rolls, and when it is desired that they shall be rewound the pawls are released from the winding-ratchets and the other set brought into operative relation with the ratchets of the rewinding-rolls.

It will be understood that the pawls and ratchets are made operative, because of the vertical movement of the bed H, the said movement lifting the ratchet-wheels in relation to the ends of the pawls and removing the teeth with which they were in contact and causing the teeth next in order to be brought into position over them, when upon the downward movement of the bed and of the rolls the ratchet-teeth engaging the ends of the pawls are held by them and the rolls thereby turned.

The operation of the mechanism is as follows: In describing it we will suppose that it is desired to obtain the weight of a load of coal in the cart. The cart is first weighed, or its weight established by the beam A and counterpoise $a$. The cart then having been filled is again weighed with its contents, the entire weight of the cart being indicated by the weight $a$. The counterpoise C is then moved upon the beam B to the point on the unit side where it most nearly balances, and the balance is then made absolute by the movement of the supplemental counterpoise upon it, and this establishes the accurate weight of the coal and at the same time brings into such position the numerals or indicators of the weight that a record or impression may be easily taken from them by the bringing into contact therewith of suitable inking apparatus and slips or cards carried thereby, and upon which by their presentation to the numerals or indicators the weight is impressed and two absolutely-correct records of the weight obtained. It will be seen that to bring the numerals or weight-indicators into position for printing movements like the ordinary movements of the counterpoises only are necessary. Those movements having been made insure the bringing into position of the weight-indicating marks or numerals, and that to secure the imprint upon the cards the recording apparatus is moved to bring the opening $h^8$ of its diaphragm beneath the weight-indicating marks or numerals, and is then moved upward to cause the impression to be made, the registering apparatus being so organized that this single movement provides a duplicate registration by means of the inking and carbon ribbons. The recording instrument must always move in the same relation to the main counterpoise before it is actuated to take an impression, and to secure registration it may have a mark upon it which shall line with a mark upon the counterpoise, or the counterpoise may have a stop depending from it with which the recording mechanism may be brought into contact before it is moved upwardly. This registering of the weight and recording thereof on one or duplicate slips or cards are of very great importance wherever there is much weighing to be done, because of the saving in time that it accomplishes, because of its accuracy, because duplicate printed records are obtained by a single action, and because it enables a material saving in the working force of the office to be made; not only because it saves in the actual time of the weighing, but also because it permits a more economical and easier system of bookkeeping to be employed.

I have described only one way of carrying into effect the essential features of my invention, and I would not be understood as limiting its scope to the particular operating devices described or to the especial location of the parts in relation to each other, as these may be modified or changed as may be required.

The invention is applicable to a scale having any number of beams, and while I have represented it as applied to one having two main beams I of course do not confine myself thereto, and by making the beams of sufficient length or by the addition of supplemental beams and weights the scale may be made to any weight. In order that the traveling beam and supplemental counterpoise E may weigh correctly it is necessary that the indicating numerals or marks thereon should be in inverted order, running from nine to nothing, or in reverse order to that of the numerals of the main beam.

It will be seen that the notches $b$ of the main scale-beam and notches $e^4$ of the supplemental beam are connected at their tops—that is, they have no level sections between them—and this construction I consider of consequence in that the large counterpoise and the small counterpoise cannot be placed in any but the desired position for the bringing into proper relation with each other of the indicating characters of the small counterpoise and the indicating characters upon the main beam preparatory to taking an impression therefrom, and the construction also permits of the accurate use of the counterpoises. It will also be seen that by making the printing or recording apparatus detached from the scale-beam inaccuracy in weighing is avoided, as the transferring of one of the ribbons from one set of operating-rolls to the other does not change the leverage of the counterpoise as it would if they were attached to the scale-beam to be movable with the counterpoise and form a part thereof.

Having thus fully described my invention, I claim and desire to secure by Letters Patent of the United States—

1. In a scale a beam having a line of impressing or printing numerals or weight indicators and a series of graduated notches occupying the full operative length of the beam, in combination with a counterpoise movable thereon and having a latch for engaging said notches which seats itself therein and centers the counterpoise and whereby the counterpoise cannot be held upon the scale beam at a point between the centers of the notches, as and for the purposes described.

2. The combination in a recording scale of a scale beam having a line of graduated notches $d$, and a line of weight indicating figures or devices, a counterpoise C movable on said beam having a latch to engage the notches thereof and a supplemental beam D which it supports and carries and which is provided with a line of graduated notches, a secondary counterpoise E mounted on said first named counterpoise by means of said beam having a latch to engage the notches thereof and a line of weight indicating numerals or other devices upon the same level as that of the line carried by the main scale beam, and independent recording devices mounted upon a slide beneath the scale beam and parallel thereto, comprising a horizontally movable slide and a vertically movable table, means for moving said table vertically in relation to the scale beam, one or more pairs of rolls for feeding inking or other printing ribbons carried by said table and movable vertically therewith and a support or supports for one or more cards or slips upon said table, the counterpoises and the scale beam being so arranged and operated in relation to each other that the indicating numerals or devices of each are adapted to be brought into the same line and the recording apparatus to be moved horizontally in line therewith and the table then to be lifted to secure a record of the weight in the same line upon the receiving cards or slips, as and for the purposes specified.

3. The combination of the scale beam B having along one side of its upper edge the line $b$ of notches and also having a track or level section upon one side thereof, a counterpoise C mounted upon said scale beam to slide thereon and carrying a latch in line with the line of notches $b$, and rolls to run upon said track, and also having downwardly extending sections upon both sides of the scale beam one of which has a tongue to enter a groove formed in the scale beam, all as and for the purposes described.

4. In a scale the combination of the beam B having the line $b$ of notches with the counterpoise C having a latch to engage the notches and downwardly extending sections upon each side of the scale beam, the front section of which is provided with an integral bar or rail, a notched bar carried by said bar or rail and a counterpoise movable upon said bar or rail having a latch to engage the notches of the notched bar carried thereby, the said counterpoise also supporting a line of printing characters, as and for the purposes described.

5. The combination of a scale beam B having a line of notches $b$ and a horizontal track and a line of printing weight indicating characters, a counterpoise C arranged to slide upon said scale having a latch to engage the notches and rolls to run upon the track and downward extending sections on each side of the scale beam, one of which has a tongue to enter a groove in the side of the scale beam, and the back side of which counterpoise is thicker and heavier than the front side, a rail or bar carried upon the front side of said counterpoise having a line of notches, a second counterpoise mounted upon said rail or bar and having a latch to engage the notched section thereof and downwardly extending sections upon each side of the bar, the outer of which sections supports in line with the line of printing weight indicating characters carried by the main beam a second line of printing weight indicating characters, all as and for the purposes described.

6. In a recording apparatus for scales the combination of a scale beam having a line of weight printing characters, a counterpoise carried by said beam and movable thereon, a second counterpoise carried by the first counterpoise and movable in relation thereto and a line of weight printing characters carried thereby, the counterpoises and weight printing characters of the beam being arranged in relation to each other as specified, with an independent recording apparatus comprising a slide horizontally movable beneath the beam upon a suitable support, a vertically movable table carried thereby, means for moving the table vertically in relation to the slide, two pairs of rolls arranged in series of two at each end of the table and attached thereto and printing ribbons extending from one of each pair of rolls to the other, means for operating one of each pair upon the vertical movement of the table in relation to the slide and a support upon the upper side of the table for the cards or strips upon which the record is made, all as and for the purposes described.

7. The combination in a weight recording apparatus of the character specified of the slide, a table mounted thereon adapted to have vertical movements imparted to it and provided with a support for the cards or ribbons to be printed, a diaphragm carried by the table and having an aperture in line with said support, two pairs of rolls carried by the table and movable vertically therewith, printing ribbons upon said rolls extending over the support and beneath the diaphragm in line with each other but separated from each other, ratchet wheels carried by said rolls and pawls to engage said ratchet wheels, the said pawls being constructed and connected to be moved into and out of operative relation with the ratchet wheels of one of each pair of rolls according to the direction in which it is desired that the ribbons shall travel and by one movement, as and for the purposes described.

JEREMIAH CAMPBELL.

Witnesses:
 F. F. RAYMOND, 2d,
 J. M. DOLON.